US007887701B2

(12) United States Patent
Schmid et al.

(10) Patent No.: US 7,887,701 B2
(45) Date of Patent: Feb. 15, 2011

(54) FLUID FILTER

(75) Inventors: Mike Schmid, Tubingen (DE); Daniel Siefert, Waiblingen (DE); Andreas Widmaier, Herrenberg (DE)

(73) Assignee: Mahle International GmbH (DE)

( * ) Notice: Subject to any disclaimer, the term of this patent is extended or adjusted under 35 U.S.C. 154(b) by 286 days.

(21) Appl. No.: 12/031,420

(22) Filed: Feb. 14, 2008

(65) Prior Publication Data

US 2008/0202081 A1 Aug. 28, 2008

(51) Int. Cl.
B01D 35/00 (2006.01)

(52) U.S. Cl. .................. 210/248; 210/444; 210/497.01; 55/498; 55/505

(58) Field of Classification Search .................... 55/498, 55/505, 510; 210/234, 235, 248, 443, 444, 210/497.01
See application file for complete search history.

(56) References Cited

U.S. PATENT DOCUMENTS

| 6,485,637 | B2 * | 11/2002 | Jainek et al. ................ 210/130 |
| 6,644,624 | B2 * | 11/2003 | Jainek ...................... 251/149.6 |
| 6,706,181 | B1 * | 3/2004 | Baumann et al. ............ 210/236 |
| 6,936,169 | B2 * | 8/2005 | Baumann et al. ....... 210/497.01 |
| 7,390,407 | B2 * | 6/2008 | Weindorf et al. ............ 210/234 |
| 2006/0118476 | A1 | 6/2006 | Weindorf et al. |

FOREIGN PATENT DOCUMENTS

| DE | 20008112 | 9/2001 |
| DE | 20006972 | 10/2001 |
| DE | 10245151 | 4/2003 |
| DE | 102004058885 | 6/2006 |
| EP | 0839563 | 5/1998 |
| EP | 1229985 | 8/2002 |
| EP | 1419809 | 5/2004 |
| EP | 1674142 | 6/2006 |
| WO | WO-00/62893 | 10/2000 |

OTHER PUBLICATIONS

English abstract provided for EP-1229985, published Aug. 14, 2002.
English abstract provided for DE-10245151, published Apr. 17, 2003.
English abstract provided for DE-102004058885 published Jun. 8, 2006.

* cited by examiner

Primary Examiner—Michael A Marcheschi
Assistant Examiner—Robert A Clemente
(74) Attorney, Agent, or Firm—Rader, Fishman & Grauer PLLC

(57) ABSTRACT

A filter assembly, having a housing including a housing bottom portion; at least one ring filter element that is received by at least one receiving space defined at least in part by the housing, wherein the receiving space includes a receiving space bottom portion; a cover attached to the housing bottom portion and configured for at least partially enclosing the at least one receiving space and the ring filter element, wherein the at least one receiving space may be selectively emptied when the cover is removed; an outlet located at the receiving space bottom portion within the cover; and a closure located on the at least one ring filter element, wherein the closure is configured to at least partially close the outlet when the at least one ring filter element is inserted into the at least one receiving space.

12 Claims, 7 Drawing Sheets

FLUID FILTER

CROSS REFERENCE TO RELATED APPLICATIONS

This application claims priority based on DE 102007009352.9 filed Feb. 23, 2007, which is hereby incorporated by reference in its entirety.

TECHNICAL FIELD

The present invention relates to a fluid filter, in particular an oil filter for cleaning lubricating oil, in particular for the internal combustion engines of motor vehicles, having the features of the preamble of claim 1.

BACKGROUND

EP 1 229 985 B1 discloses a fluid filter having a housing in which there is a receiving space for receiving a ring filter element, said space being closable by a cover. Furthermore, an inlet for crude fluid, an outlet for cleaned fluid and an outlet through which the receiving space can be emptied on removal of the cover are also provided. This outlet is at the bottom of the receiving space in the installed state of the fluid filter. In addition, a closure is provided on the ring filter element for closing the outlet when the ring filter element is inserted into the receiving space and the receiving space is closed by the cover. With the known fluid filter, said closure is formed by a journal arranged eccentrically to protrude axially away from the ring filter element. With the known fluid filter, the receiving space is closed by the cover from above, and the outlet is provided at the bottom of the receiving space in the housing. With the known fluid filter, to simplify locating and inserting the journal into the outlet, a concentrically arranged and helically ascending ramp is provided on the housing, such that the outlet is arranged between a lower end of the ramp and an upper end of the ramp. When the cover is screwed in place, the journal locates the outlet automatically and can penetrate into it and close it due to the rotational movement of the ring filter element and due to the journal sliding along the ramp. In an especially advantageous embodiment of the known fluid filter, the ramp and the journal can work together according to the lock-and-key principle in such a way that only a ring filter element provided with a journal adapted to the ramp can be used with the known fluid filter, such that the closure locates the outlet automatically and closes it when the cover is screwed into place.

DE 200 06 972 U1, DE 200 08 112 U1 and WO 00/62893 A1 disclose other fluid filters with which the cover closes the receiving space from underneath in the installed state such that the cover has the outlet arranged concentrically with the longitudinal central axis of the ring filter element and is closed from the outside by a closure in the form of a screw designed as a separate component. Before removing the cover, the receiving space can thus be emptied by removing the closure.

SUMMARY

The present invention relates to the problem of providing an improved embodiment or at least another embodiment for a fluid filter of the type defined in the introduction such that it will allow in particular a different installation situation for the fluid filter.

According to this invention, this problem is solved by the subject matters of the independent claims. Advantageous embodiments are the subject matter of the dependent claims.

The present invention is based on the general idea of integrating the outlet into the cover, and it is especially important here that the closure assigned to the outlet is still arranged on the ring filter element, so that the closure can open the outlet automatically on removal of the cover. Furthermore, it is proposed that the fluid filter be designed in such a way that when installed, the cover that closes the receiving space is arranged at the bottom of the housing. In this way, the outlet is automatically at a low location which facilitates emptying of the receiving space in removal of the cover.

In the case of the inventive fluid filter, the receiving space is emptied on removal of the cover through the outlet toward the outside so that the fluid flowing out through the outlet can be collected in an external container. It is advantageous here that the receiving space is largely emptied until the cover can be removed from the housing. Then, with the cover removed, the ring filter element can be replaced. It is especially advantageous here that it is possible to work comparatively cleanly when replacing the ring filter element because the closure is removed from the outlet on the inside of the outlet and not from the outside. Furthermore, this also prevents the closure from being forgotten when replacing the ring filter element.

In a preferred embodiment, the ring filter element is axially secured on the housing in such a way that when there is a relative axial movement between the cover and the housing that is performed to open the receiving space, the closure opens the outlet, in particular before the cover has been and/or can be removed from the housing. This means that the ring filter element remains on the housing when the cover is removed and is not necessarily removed along with the cover. This can simplify handling of the ring filter element.

The closure that is provided on the ring filter element may be formed by a journal protruding axially away from the ring filter element, such that the outlet then has an outlet opening into which the journal is inserted axially for closing the outlet. Alternatively, the closure formed on the ring filter element may also be formed by a cap that is open axially toward the outside, such that the outlet then has a connection that protrudes axially into the receiving space and penetrates axially into the cap to close the outlet. Although the embodiment using journals may perhaps be easier to seal, there is a reduced risk of damage to the ring filter element when it is replaced in a careless manner in the embodiment having a cap.

The outlet and the closure may be arranged concentrically on the cover and/or on the ring filter element. Alternatively, the outlet and closure may be arranged eccentrically on the cover and/or on the ring filter element. Both embodiments have certain advantages.

In the case of an eccentric arrangement of the outlet and the closure, according to an advantageous embodiment, a ramp arranged concentrically and ascending helically may be provided, as is known per se from EP 1 299 895 B1 which was cited in the introduction and which is herewith added to the disclosure content of the present invention through this explicit reference thereto. Depending on the embodiment, said ramp may be arranged either on the cover so that the outlet is arranged between a lower end of the ramp and an upper end of the ramp or on the ring filter element in such a way that the closure is arranged between a lower end of the ramp and an upper end of the ramp. The ramp simplifies the locating of the relative position between the closure and the outlet as is required for closing the outlet.

Furthermore, in another embodiment, it is possible to provide for the ramp and journal and/or the ramp and connection to be designed so that they cooperate according to the key and lock principle. Subsequently only a ring filter element provided with a journal adapted to the ramp and/or only a ring filter element provided with a ramp adapted to the connection can be used with the fluid filter in such a way that the closure locates the outlet automatically and closes it when the cover is screwed in place. Due to this embodiment, to secure proper functioning of the fluid filter, this should achieve the result that only the ring filter elements actually provided for the fluid filter may be used, e.g., to prevent inadvertent use of the wrong ring filter element. The exclusivity criterion "only" in the present context refers to the fact that the closure locates the outlet automatically and closes it when the proper and/or adapted ring filter element is used in screwing the cover on regularly—exceptions are of course also possible—whereas in the case of a ring filter element that is not adapted properly, if the closure is present it will not find the outlet and accordingly will not close it when screwing on the cover in the regular manner—and exceptions are also possible here.

Other important features and advantages of the present invention are derived from the dependent claims and the drawings and from the respective description of the figures on the basis of the drawings.

It is self-evident that the features mentioned above and those yet to be explained below may be used not only in the particular combination indicated but also in other combinations or alone without going beyond the scope of the present invention.

BRIEF DESCRIPTION OF THE DRAWING

Preferred exemplary embodiments of the invention are depicted in the drawings and explained in greater detail in the following description, where the same reference numerals are used to refer to the same or similar or functionally the same components.

In each, schematically

DETAILED DESCRIPTION

Figure 1:
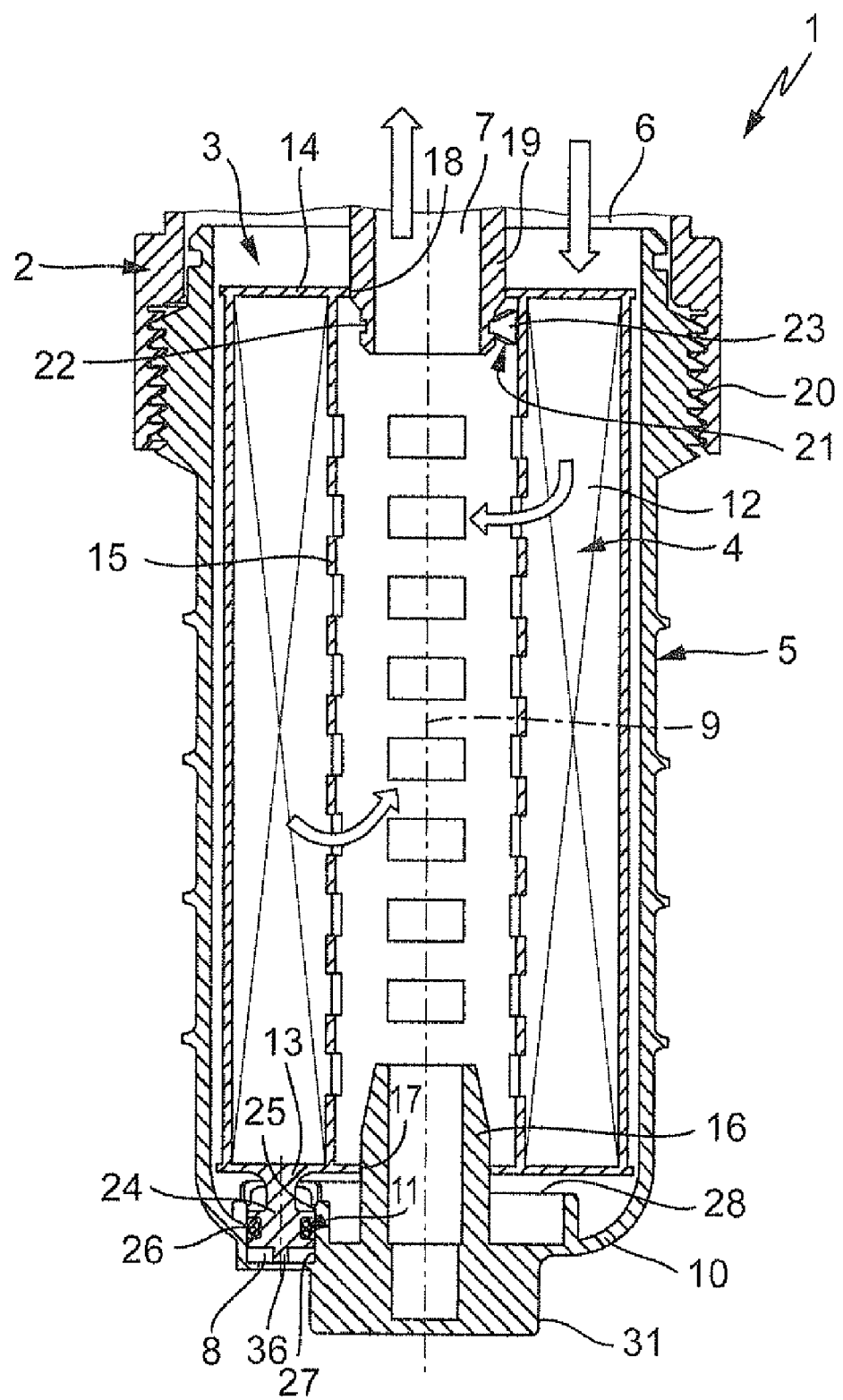
FIG. 1 shows a longitudinal section through a part of a fluid filter.

According to FIG. 1, a fluid filter 1 comprises a housing 2 (shown here only in part) and at least one receiving space 3. The receiving space 3 serves to receive a ring filter element 4 and can be closed with a cover 5, which to this end can be attached to the housing 2. The fluid filter 1 may preferably be designed as an oil filter for cleaning lubricating oil and may be provided in particular for internal combustion engines in motor vehicles. Alternatively, it is fundamentally also possible to design the fluid filter 1 as a fuel filter. Although in the embodiment shown here, the fluid filter 1 has only one receiving space 3 in or on its housing 2, embodiments having two or more receiving spaces 3 are also possible. For example, an embodiment having three receiving spaces 3 is possible, in which case it is then possible to provide for two of the ring filter elements 4 to be arranged in parallel or in series with a main stream of the fluid to be cleaned, whereas the third ring filter element 4 is provided for cleaning a side stream.

The fluid filter 1 also comprises an inlet 6 for crude fluid, i.e., for fluid to be cleaned and an outlet 7 for clean fluid, i.e., for fluid that has been cleaned. The fluid flow occurring inside the fluid filter 1 during operation is indicated by arrows here. In the present case, the ring filter element 4 has flow passing through it radially from the outside to the inside, but essentially any other design is also conceivable. Furthermore, the fluid filter 1 has an outlet 8 through which the receiving space 3 can be emptied when the cover 5 is removed. When the fluid filter 1 as shown in FIG. 1, said outlet 8 is arranged at the bottom of the receiving space 3.

The installed position illustrated here is characterized by an essentially vertical longitudinal central axis 9 of the ring filter element 4. To the extent that this is an upright arrangement of the fluid filter 1, in particular an upside down arrangement, which may also be referred to as a hanging arrangement. In this installed position, the cover 5 is arranged at the bottom of the housing 2 when it seals the receiving space 3. Accordingly, the outlet 8 is designed in and/or on the cover 5. The outlet 8 is expediently arranged in the bottom 10 of the cover 5 bordering the receiving space 3 at the bottom. In the preferred embodiments shown here, the receiving space 3 is largely designed inside the cover 5 so that the cover 5 is shaped essentially in a pot shape. Fundamentally, however, another embodiment is also possible, in which the receiving space 3 is mostly or completely designed in the inside of the housing 2.

When installed, the ring filter element has a closure 11 at the bottom. In the completely assembled state shown here, the ring filter element 4 is inserted into the receiving space 3, while the receiving space 3 is covered completely by the cover 5 and the closure 11 closes the outlet 8.

The ring filter element 4 consists, for example, of a filter material 12, which is arranged in a ring shape coaxially with the central longitudinal axis 9 and may consist of a pleated sheeting material, for example. In addition, the ring filter element 4 has an end disk on each of its axial end faces, namely a lower end disk 13 and an upper end disk 14. The filter material 12 may be fixedly attached axially to the end disks 13, 14, in particular by welding.

Furthermore, the ring filter element 4 may have a groove 15 on the inside radially on which the filter element 12 may be supported on the inside radially. The inner groove 15 has a plurality of openings (not shown in detail here) through which the cleaned fluid can enter the clean interior of the ring filter element 4 and can escape from the receiving space 3 through the outlet 7. The closure 11 is preferably arranged on the lower end disk 13. The closure 11 may be integrally shaped on the lower end disk 13. It is likewise possible to manufacture the closure 11 as a separate component and attach it to the lower end disk 13.

In the example shown in FIG. 1, the cover 5 has a mandrel 16 which is concentric with the central longitudinal axis 9 and, when installed, it protrudes into the inner groove 15 axially through a central opening 17 in the lower end disk 13. To seal the crude side from the clean side, the lower end disk 13 may be provided with a suitable gasket (not shown here) on the inside radially. In another embodiment, instead of an open lower end disk 13, a closed lower end disk 13 may also be provided.

Furthermore, the end disk 14 has a central opening 18 into which an outlet connection 19 formed on the housing 2 protrudes coaxially in the installed state. Here again, a seal is expediently provided on the crude side with respect to the clean side with the help of a gasket (not shown here), which is formed on the upper end disk 14.

In the area of the upper end disk 14, the ring filter element 4 is secured axially on the housing 2. The holding force of this axial attachment between the ring filter element 4 and the housing 2 is designed to be larger than the holding force between the ring filter element 4 and the cover 5 of an axial attachment between the closure 11 and the outlet 8. This achieves the result that with a relative axial movement between the cover 5 and the housing 2, which is performed to open the receiving space 3, the closure 11 opens the outlet 8. This means that the ring filter element 4 does not follow the relative of the cover 5 but instead remains stationary in the axial direction in relation to the housing 2. The cover 5 is preferably attached to the housing 2 by a screw connection 20. Alternatively, essentially a different type of attachment may be selected, e.g., a bayonet closure. The screw connection 20 and/or the respective other type of fastening is preferably adapted, so that, when removing and/or screwing the cover 8 in place, the outlet 8 is opened even before the cover 5 can be completely removed from the housing 2. The result is that the receiving space 3 is at least partially emptied through the outlet 8 by the time the cover 5 can be removed from the housing 2.

The axial attachment of the ring filter element 4 to the housing 2 can be accomplished, e.g., with the help of a catch connection 21 which makes it possible to secure the ring filter element 4 detachably to the housing 2 in such a way that it can be removed from the housing 2 again nondestructively, or at least without destroying the housing 2. The catch connection 21 shown here comprises, for example, a ring groove 22 that is formed on the outside of the outlet connection 19 radially and several catch bodies 23 that protrude radially toward the inside and are formed on the inner groove 15 in such a way that they are distributed in the circumferential direction and engage radially in the ring groove 22 from the outside. In this embodiment, the catch connection 21 is designed so that the ring filter element 4 can be rotated about its central longitudinal axis 9 in relation to the housing 2, whereas it is secured on the housing 2 in the axial direction at the same time.

Figure 2:
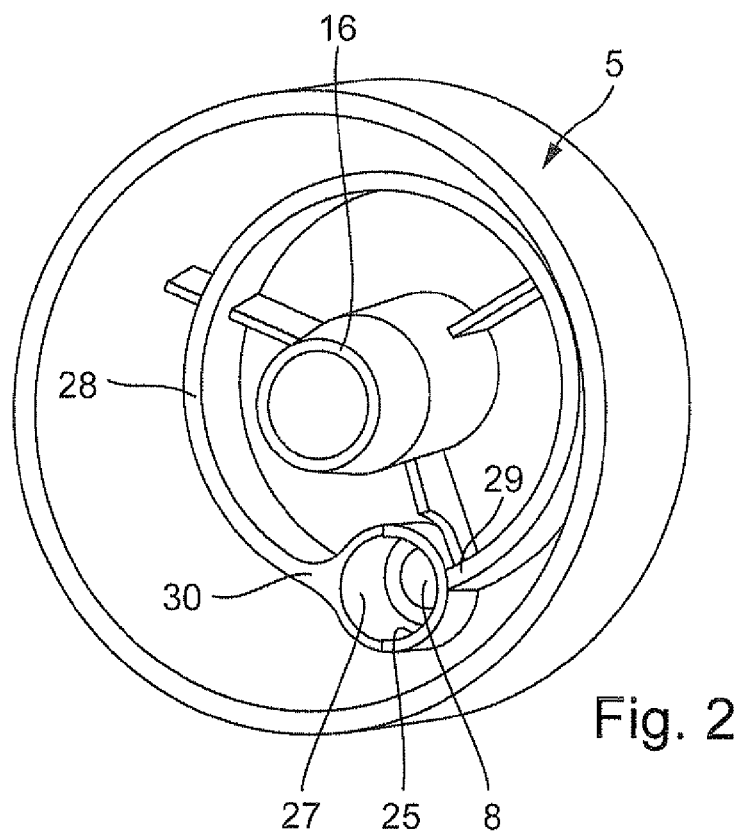
FIG. 2 shows a perspective view into a cover of the fluid filter.

In the embodiment shown in FIGS. 1 and 2, the closure 11 is formed by a journal 24, while the outlet 8 has an outlet opening 25. The journal 24 engages in this outlet opening 25 to close the outlet 8. The journal 24 may expediently therefore have a seal 26 that acts radially, e.g., an O-ring which cooperates with a wall of a channel section 27 of the outlet 8.

Furthermore, in the embodiment according to FIGS. 1 and 2 the outlet 8 is arranged on the cover 5 so that it is eccentric with respect to the central longitudinal axis 9. Likewise, the closure 11 is arranged on the ring filter element 4 so that it is eccentric with regard to the central longitudinal axis 9. To simplify the locating and closing of the outlet 8 with the closure 11 in this eccentric arrangement of the free will 8 and the closure 11, in the embodiment according to FIGS. 1 and 2, a ramp 28 is also provided and is arranged concentrically with regard to the central longitudinal axis 9 and rises or falls in a helical pattern, depending on the system of reference. In the example according to FIGS. 1 and 2, this ramp 28 is arranged on the cover 5, namely on the bottom 10 on a side facing the receiving space 3 so that the outlet 8 is situated between a lower end 29 of the ramp and an upper end 30 of the ramp.

At last the embodiment of the fluid filter 1 illustrated in FIGS. 1 and 2 functions as described below.

Starting from the installed state illustrated in FIG. 1, for example, a used ring filter element 4 is to be replaced by a new one. To do so, the cover 5 is removed from the housing 2, e.g., by unscrewing it from the housing 2. The cover 5 may be equipped externally with a polygonal insert bit 31 on its bottom 10 that allows the use of a suitable tool. When the cover 5 is screwed on, the cover 5 rotates about the central longitudinal axis 9 on the one hand, while on the other hand, distancing itself from the housing 2 in the axial direction. The ring filter element 4 is coupled to the housing 5 in a rotationally fixed manner via the eccentric journal 24 engaging in the outlet opening 25 so that the ring filter element 4 copies the rotational movement of the cover 5. The ring filter element 4 can be rotated about its central longitudinal axis 9 with respect to the housing 2, which is implemented in the area of the axial attachment, i.e., here by the catch connection 21. However, the ring filter element 4 remains stationary axially in relation to the housing 2 so that the housing 2 is also moved axially in relation to the ring filter element 4 in screwing it on. In this way, the journal 24 is gradually pulled out of the outlet 8 with respect to the receiving space 3 and toward the interior. As soon as the outlet 8 has been opened, the receiving space 3 can run outward through the outlet 8 into an environment 32 of the fluid filter 1. The fluid running out is then collected in a suitable container. When the outlet 8 is opened, the cover 5 is still on the housing 2 and must also be screwed on. As soon as the screw connection 20 releases the cover 5, it can be removed downward from the housing 2 while the ring filter element 4 remains on the housing 2. The receiving space 3 is then open and then the ring filter element 4 is accessible for replacement. In replacing the ring filter element 4, the old ring filter element 4 is removed from the housing 2. There are now several options for mounting the new ring filter element 4. First, the new ring filter element 4 can be inserted easily into the cover 5 and it is not necessary for the journal 24 to be already engaged in the outlet opening 25. Instead it is expected that the journal 24 will come in contact axially with the ramp 28 at any other location or may even be a distance away from the latter because the ring filter element 4 must be placed on the mandrel 16 against resistance. When screwing the cover 5 into the housing 2, the ring filter element 4 is placed on the outlet connection 19, while at the same time the mandrel 16 penetrates more deeply into the ring filter element 4. As soon as the journal 24 comes in contact with the ramp 28 axially, the journal 24 may slide along the ramp 28 in the direction of the lower end 29 of the ramp due to the rotational movement of the cover 5. As soon as the journal 24 passes over the lower end 29 of the ramp, it becomes aligned with the outlet opening 25. Since the upper end 30 of the ramp prevents further rotational adjustment between the ring filter element 4 and the cover 5, further tightening of the cover 5 by tightening the screws leads to entrainment of the ring filter element 4, so that it also rotates with the cover 5 and thereby moves in the radial direction in relation to the cover 5 and/or in relation to the housing 2. At the latest when the cover 5 has been completely screwed on, the journal 24 is completely inserted into the outlet 8 and the catch bodies 23 are engaged in the ring groove 22. It is thus essentially possible to tighten the ring filter element 4 manually in relation to the cover 5 when screwing it into the cover 5, so that the journal 24 slides along the ramp 28 and penetrates into the outlet 8. Next the cover 5 can be mounted on the housing 2 with the premounted ring filter element 4. It is likewise possible to first attach the ring filter element 4 to the housing 2, i.e., to engage it on the outlet connection 19. Here again, when subsequently screwing the cover 5 in place, with a suitable adaptation of the slope of the ramp to the pitch of the thread of the screw connection 20, it is possible to achieve the result that the cover 5 rotates together with the ring filter element 4 only when the journal 24 is aligned with the inlet opening 25.

FIGS. 3 through 10 illustrate several different exemplary embodiments of the fluid filter 1, although without any claim that this is complete and without restricting the general scope in any way.

Figure 3:
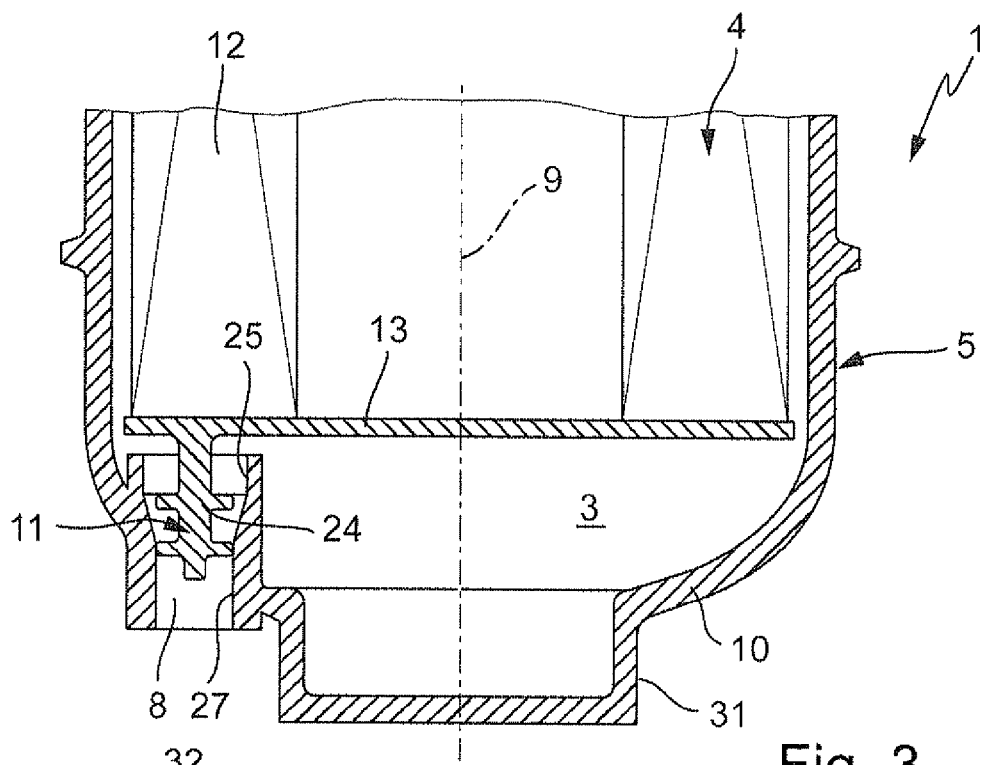
FIGS. 3 through 10 each show a simplified longitudinal section in a lower partial area of the fluid filter in different embodiments.
Figure 4:
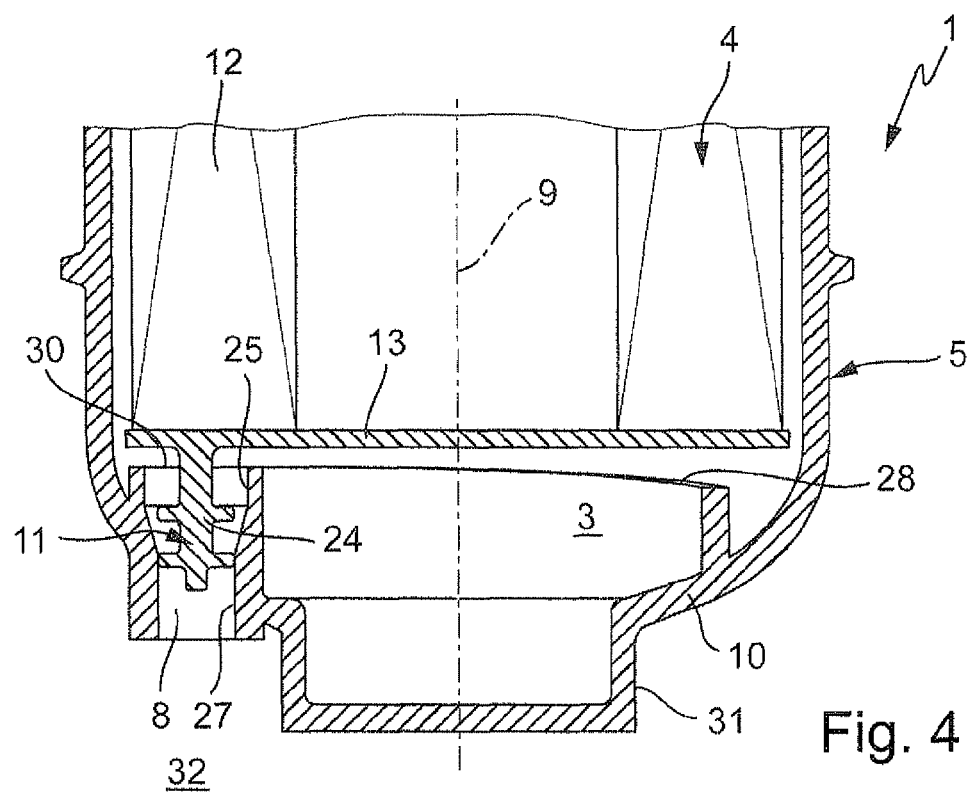
Figure 5:
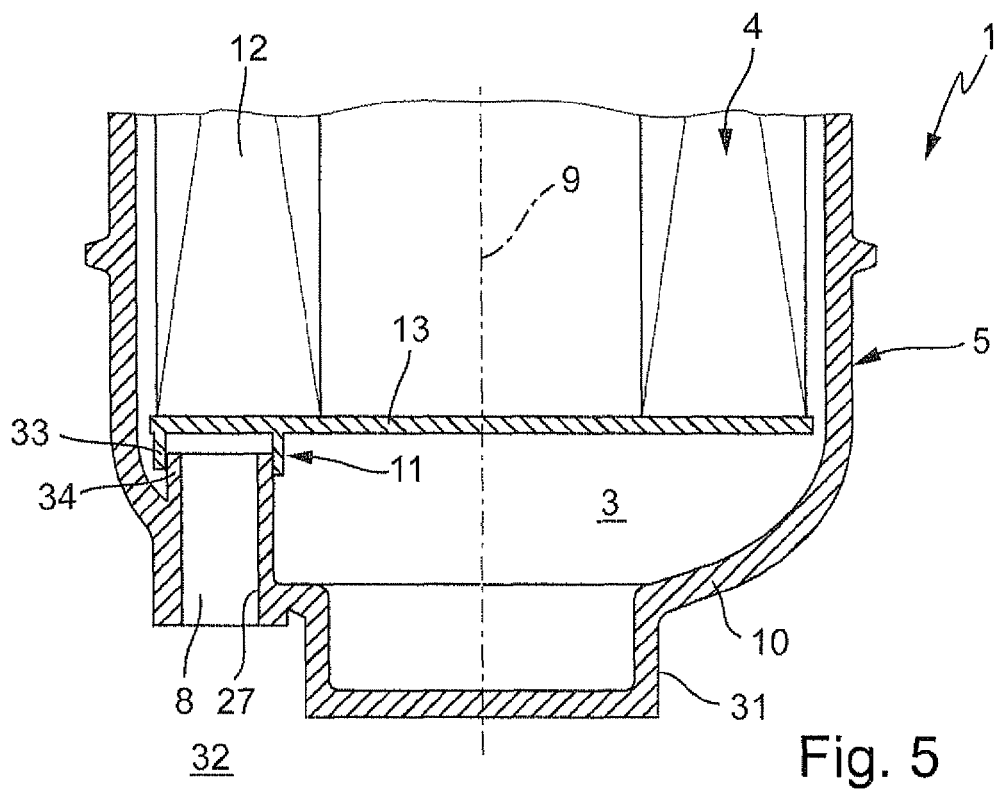
Figure 7:
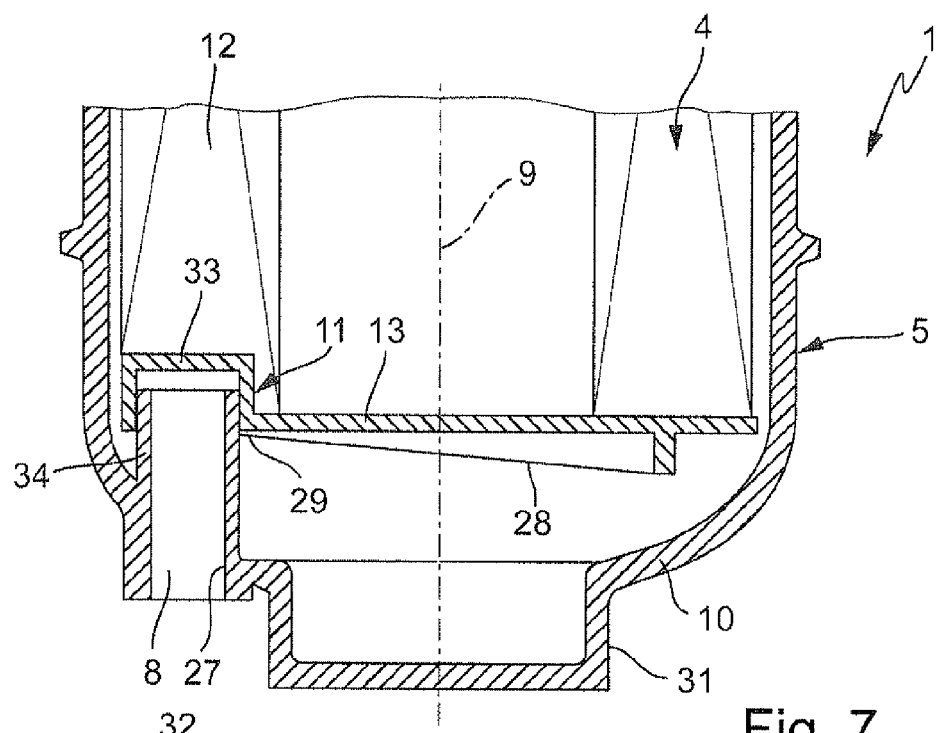
Figure 8:
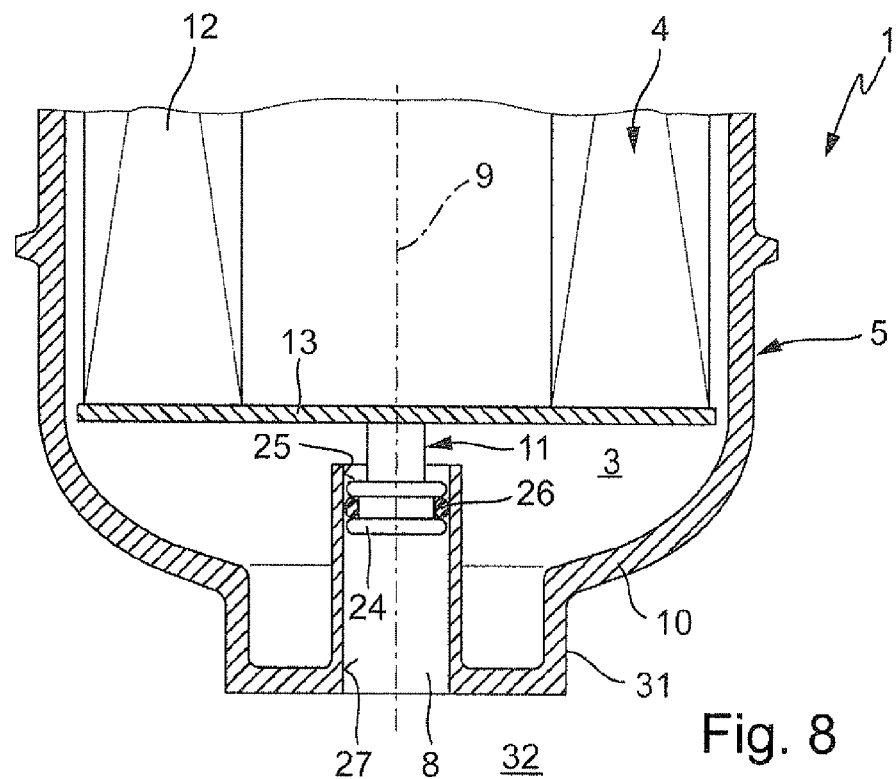
Figure 9:
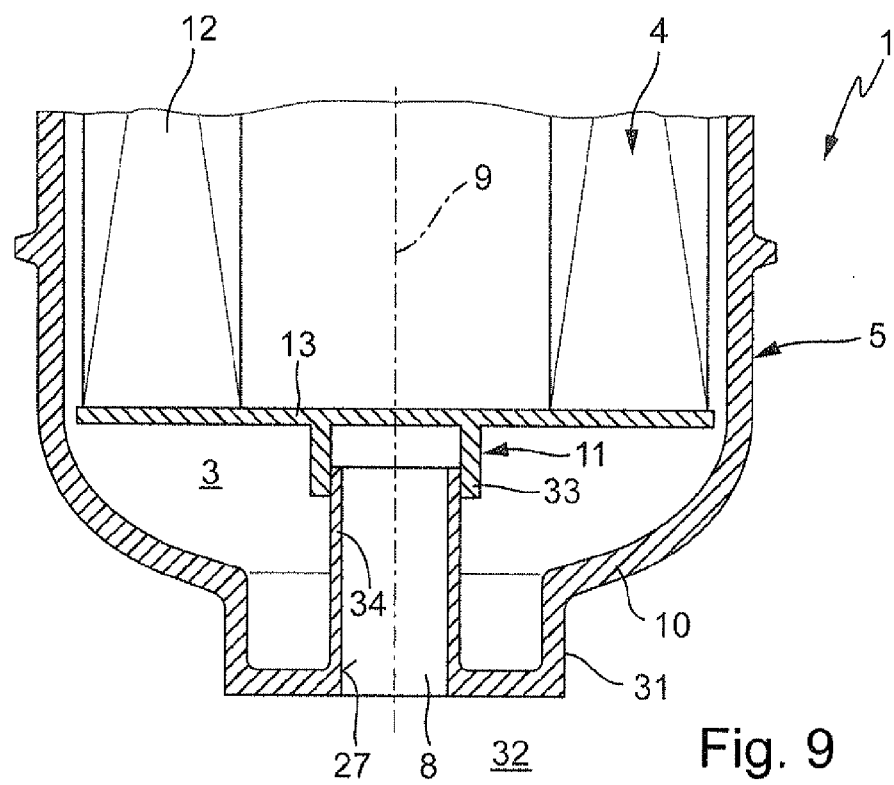
Figure 10:
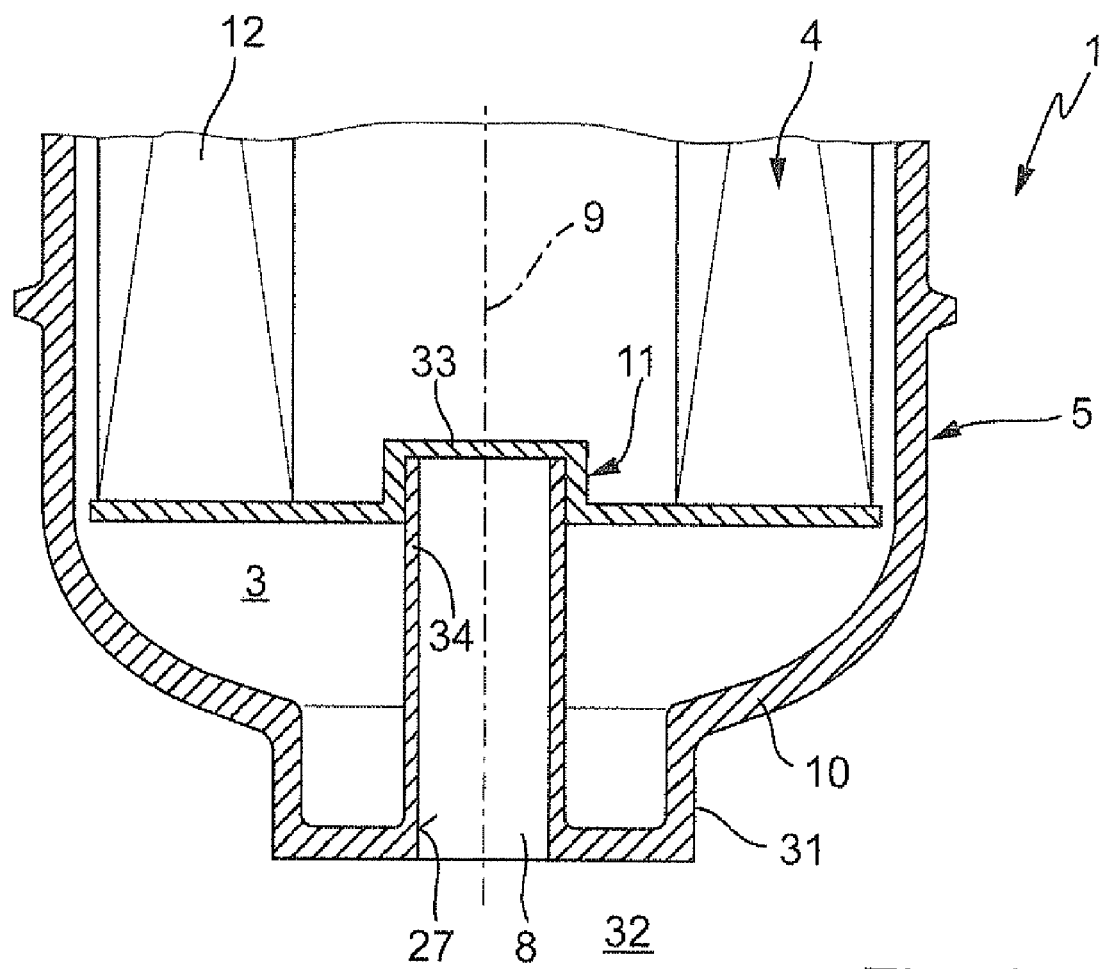

In the embodiments of FIGS. 3, 4 and 8, as in the example according to FIG. 1, the closure 11 is designed as a journal 24 protruding axially at the bottom away from the ring filter element 4. Accordingly in these embodiments, the outlet 8 is equipped with an outlet opening 25 into which the journal 24 penetrates axially to close the outlet 8. In contrast with that, in the embodiments according to FIGS. 5 through 7, 9 and 10, the closure 11 is formed by a cap 33, which is open toward the outside axially, i.e., away from the ring filter element 4. In these embodiments, the outlet 8 is provided with a connecting piece 34, which protrudes axially into the receiving space 3 and penetrates axially into the cap 33 to close the outlet 8. The cap 33 is designed with a sleeve shape in the embodiments according to FIGS. 5, 6 and 9, such that the cap 33 in these embodiments protrudes axially away from the ring filter element 4 and/or from its lower end disk 13. In the embodiments according to FIGS. 7 and 10, the cap 33 is designed with a pot shape, such that the cap 33 protrudes axially into the respective ring filter element 4. As in the embodiment according to FIG. 7, it is also possible to provide for the filter material 12 to be cut to size accordingly in the area of the cap 33. It is likewise possible to provide the lower end disk 13 axially with a suitable thickness to integrate the cap 33 into it. In the embodiment shown in FIG. 10, the cap 33 is arranged on the inside with respect to the filter material 12 so that the structural adaptation of the ring filter element 4 is comparatively small. Likewise, an embodiment in which the cap 33 protrudes axially into the ring filter element in a pot-like manner and, on the other hand, also protrudes axially away from the ring filter element 4 like a sleeve is also possible.

In the embodiments in FIGS. 3 through 7, the outlet 8 and the closure 11 are arranged on the cover 5 and/or on the ring filter element 4, so that they are eccentric with respect to the central longitudinal axis 9. In the embodiments according to FIGS. 8 through 10, the outlet 8 is arranged on the cover 5 so that it is concentric with the central longitudinal axis 9, while at the same time, the respective closure 11 is arranged on the ring filter element 4 so that it is concentric with regard to the central longitudinal axis 9. The concentric arrangement of the outlet 8 and the closure 11 may also be advantageous with regard to locating the correct relative position for the closure 11 in relation to the outlet 8 for closing the outlet 8.

Figure 6:
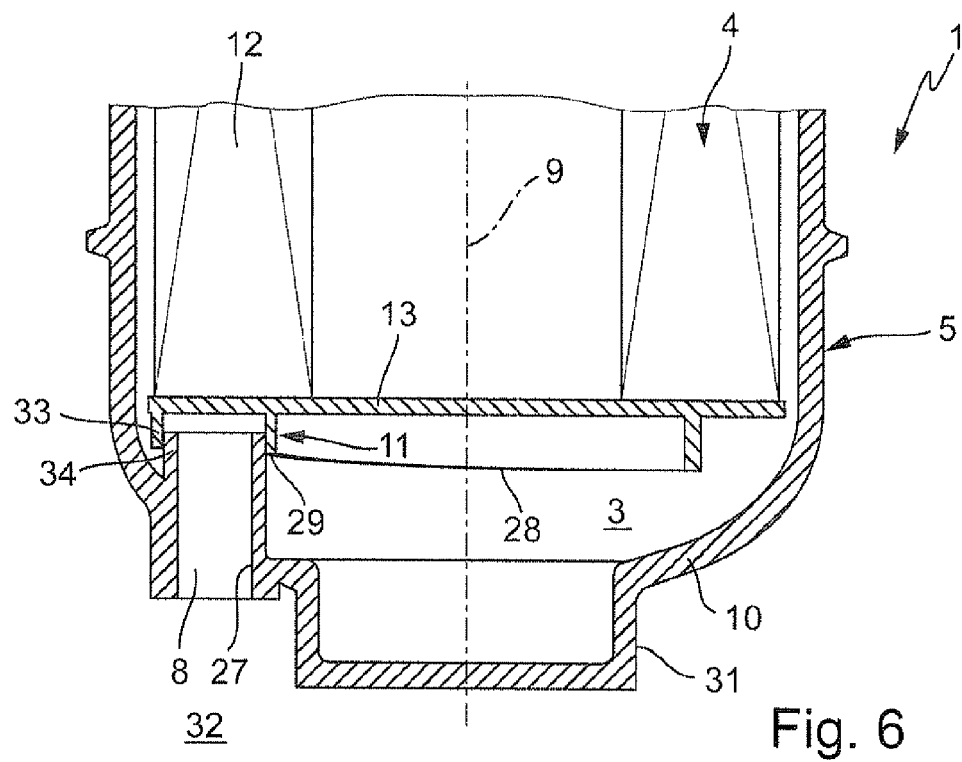

To also simplify the process of locating the correct relative position between the closure 11 and the outlet 8 for closing the outlet 8 even with an eccentric arrangement of the outlet 8 and the closure 11, the embodiments according to FIGS. 4, 6 and 7 are each equipped with a ramp 28. Said ramp 28 is arranged on the cover 5 in the embodiment shown in FIG. 4 as well as that in FIG. 1, so that the outlet 8 is situated between the lower end 29 of the ramp and the upper end 30 of the ramp. In the embodiments according to FIGS. 6 and 7, however, the respective ramp 28 is situated on the ring filter element 4, namely preferably on the lower end disk 13 such that the ramp 28 protrudes outward axially, i.e., facing away from the ring filter element 4. The arrangement of the respective ramp 28 on the ring filter element 4 is such that the respective closure 11 is again situated between the lower end 29 of the ramp and the upper end 30 of the ramp.

Figure 11:
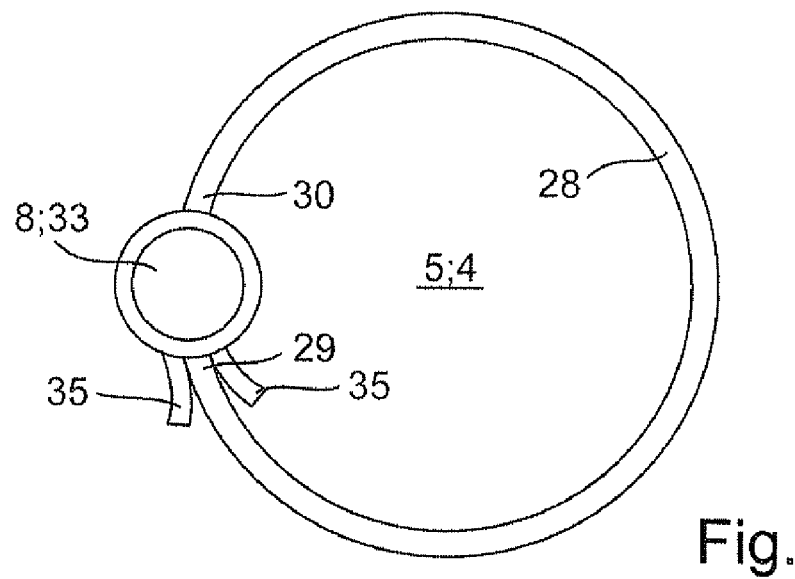
FIG. 11 shows a greatly simplified top view of a ramp.
Figure 12:
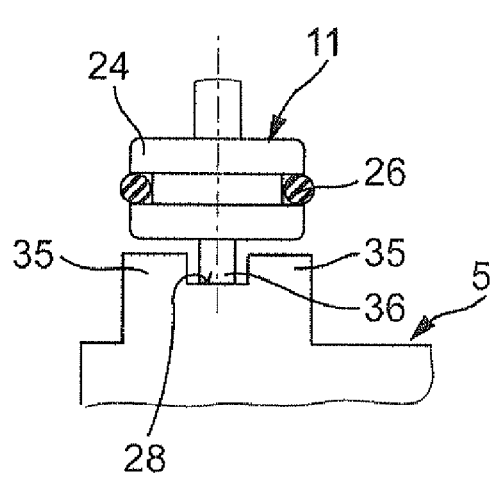
FIGS. 12 and 13 show greatly simplified longitudinal sections in the area of the ramp in different embodiments.
Figure 13:
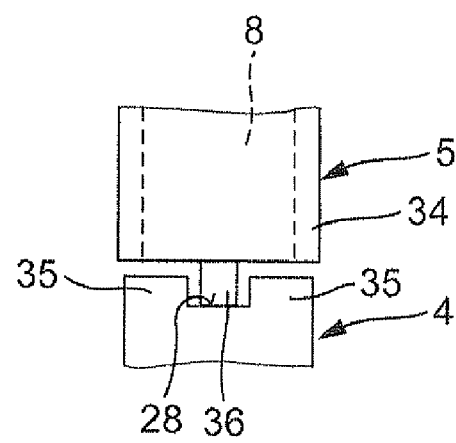

The embodiments equipped with a ramp 28, in particular those in FIGS. 1, 2, 4, 6 and 7, can be designed expediently according to FIGS. 11 through 13 such that the respective ramp 28 and the journal 24 and/or the ramp 28 and the connecting piece 34 work together according to the lock-and-key principle. This lock-and-key principle means that only such ring filter elements 4 in which the journal 24 is adapted to the ramp 28 of the cover 5 and/or in which the ramp 28 formed on the ring filter element 4 is adapted to the connecting piece 34 of the cover 5 can be used properly with the fluid filter 1. The proper use that is relevant here means that the respective closure 11 locates the outlet 8 automatically and closes it when attaching, i.e., turning the cover 5. When the ring filter elements are not specifically adapted to the fluid filter 1, the lock-and-key principle prevents any closure that may optionally be provided from being able to automatically locate and close the outlet 8 when screwing on the cover 5. This should achieve the result that precisely adapted ring filter elements 4 can be used only for the fluid filter 1, e.g., to be able to ensure a proper filtration function.

To implement the lock-and-key principle, an insertion contour having guide bodies 35 may be provided on the respective lower end 29 of the ramp according to FIGS. 11 through 13, for example; these guide bodies may in turn be arranged on one or both sides of the ramp 28 and protrude axially beyond the ramp 28. A journal 24 sliding downward along the ramp 28 and/or a connecting piece 34 sliding downward along the ramp 28 may reach the outlet opening 25 and/or the cap 33 only if it has a protrusion 36 that protrudes axially away from the respective closure 11 and is adapted to the guide bodies 35. This protrusion 36 may be, for example, a pin-shaped or web-shaped lug that establishes contact between the journal 24 and/or the connecting piece 34 and the ramp 28. This protrusion 36 is dimensioned axially in such a way that it can lift the journal 24 and/or the connecting piece 34 beyond the guide elements 35. This means that the journal 24 or connecting piece 34 sliding over the protrusion 36 on the ramp 28 is at a distance axially from the guide elements 35 such that it can be aligned with the outlet opening 25 and/or the cap 36 passing by the guide bodies 35. According to FIGS. 11 through 13, the protrusion 36 may come in contact with the ramp 28 between the guide elements 35 and thereby allow the journal 24 and/or the connecting piece 34 to slide on the ramp.

Moreover, with regard to the lock-and-key principle and its implementation, reference is made to EP 1 229 985 B1, which was cited in the introduction and is herewith appended to the present invention through explicit reference to the disclosure content.

The invention claimed is:

1. A filter assembly, comprising:
   a housing including a housing bottom portion;
   at least one ring filter element that is received by at least one receiving space defined at least in part by the housing, wherein the receiving space includes a receiving space bottom portion;
   a cover attached to the housing bottom portion and configured for at least partially enclosing the at least one receiving space and the ring filter element, wherein the at least one receiving space may be selectively emptied when the cover is removed;
   an outlet located at the receiving space bottom portion within the cover; and
   a closure located on the at least one ring filter element, wherein the closure is configured to at least partially close the outlet when the at least one ring filter element is inserted into the at least one receiving space, wherein the filter assembly includes a ramp having a lower end and an upper end, the ramp is connected to one of the cover and the at least one ring filter element, and wherein the closure is created by a cap that opens axially towards the exterior of the filter assembly, and the outlet includes a connecting piece for protruding axially into the at least one receiving space, and penetrating axially into the cap for at least partially closing the outlet.

2. The filter assembly as recited in claim 1, wherein the closure at least partially opens the outlet when the cover is removed.

3. The filter assembly as recited in claim 1, wherein the at least one ring filter element is axially secured to the housing by a catch connection, and as relative axial movement between the cover and the housing occurs, the closure at least partially opens the outlet before the cover has been removed from the housing, and wherein the catch connection permits rotational movement of the at least one ring filter element about an axis of rotation of the housing.

4. The filter assembly as recited in claim 3, wherein the catch connection is released from the housing nondestructively.

5. The filter assembly as recited in claim 1, wherein the cap protrudes in at least one of a pot manner and a sleeve manner, wherein the cap protrudes axially into the at least one ring filter element in the pot manner and protrudes axially away from the at least one ring filter element in the sleeve manner.

6. The filter assembly as recited in claim 1, wherein both of the outlet and the closure are arranged one of concentrically and eccentrically with respect to a central longitudinal axis of the filter assembly.

7. The filter assembly as recited in claim 1, wherein the outlet and the closure are arranged eccentrically.

8. The filter assembly as recited in claim 1, wherein the ramp is located on the cover such that the outlet is located between the lower end and the upper end.

9. The filter assembly as recited in claim 1, wherein the ramp ascends helically with respect to the filter assembly and includes a concentric arrangement.

10. The filter assembly as recited in claim 1, wherein the cover is threadingly engaged with the housing bottom portion.

11. The filter assembly as recited in claim 1, wherein the cover comprises a mandrel, and wherein the mandrel is concentric with the central longitudinal axis and protrudes into the filter element axially through a central opening in an end disc of the filter element.

12. A filter assembly, comprising:
a housing including a housing bottom portion;
at least one ring filter element that is received by at least one receiving space having a receiving space bottom portion and defined at least in part by the housing;
a cover attached to the housing bottom portion and configured for at least partially enclosing the at least one receiving space and the ring filter element, wherein the at least one receiving space may be selectively emptied when the cover is removed;
an outlet located at the receiving space bottom portion within the cover; and
a closure configured to at least partially close the outlet when the at least one ring filter is inserted into the at least one receiving space, the closure located on the at least one ring filter element, and the filter assembly includes a ramp having a lower end and an upper end, the ramp is connected to one of the cover and the at least one ring filter element, wherein the ramp is arranged on the at least one ring filter element such that the outlet is located on the lower end and the at least one ring filter element is located on the upper end, and the closure is located between the lower end and the upper end.

* * * * *

UNITED STATES PATENT AND TRADEMARK OFFICE
CERTIFICATE OF CORRECTION

PATENT NO. : 7,887,701 B2
APPLICATION NO. : 12/031420
DATED : February 15, 2011
INVENTOR(S) : Mike Schmid et al.

It is certified that error appears in the above-identified patent and that said Letters Patent is hereby corrected as shown below:

On the Title Page:

Item [75] Inventors, please change the residence for inventor Daniel Siefert from "Waiblingen (DE)"

to "March (DE)"

Item [30] Foreign Application Priority Data, please add the following missing priority data:

"February 23, 2007   (DE) ........................102007009352.9"

Signed and Sealed this
Tenth Day of May, 2011

David J. Kappos
*Director of the United States Patent and Trademark Office*